United States Patent
Munoz (10) Patent No.: US 7,737,831 B2
(45) Date of Patent: Jun. 15, 2010

(54) MULTI-FUNCTION CONTROL AND DISPLAY APPARATUS AND DEVICE FOR AUTOMOBILES

(76) Inventor: Alex Munoz, 300 N. Florence St., Burbank, CA (US) 91505

( * ) Notice: Subject to any disclaimer, the term of this patent is extended or adjusted under 35 U.S.C. 154(b) by 800 days.

(21) Appl. No.: 11/672,027

(22) Filed: Feb. 6, 2007

(65) Prior Publication Data

US 2007/0142977 A1    Jun. 21, 2007

(51) Int. Cl.
  *B60R 25/10* (2006.01)
  *H04B 1/38* (2006.01)
  *G05B 23/02* (2006.01)
  *G05D 3/00* (2006.01)

(52) U.S. Cl. ............ 340/426.35; 340/426.36; 340/5.62; 340/5.61; 340/3.1; 318/466

(58) Field of Classification Search .......... 340/3.1, 340/5.2, 5.51, 5.61, 5.62, 5.63, 5.64, 426.35, 340/426.36, 426.24, 426.28, 426.32, 426.34, 340/438, 5.7, 5.72, 825.69; 49/25–31; 296/107.07, 296/107.08, 107.09, 107.17, 108; 318/466

See application file for complete search history.

(56) References Cited

U.S. PATENT DOCUMENTS

| | | | | |
|---|---|---|---|---|
| 5,838,255 | A * | 11/1998 | Di Croce | 340/825.69 |
| 6,025,776 | A * | 2/2000 | Matsuura | 340/438 |
| 2002/0190872 | A1 * | 12/2002 | Suman et al. | 340/825.69 |
| 2003/0231131 | A1 * | 12/2003 | Dimig et al. | 341/176 |
| 2006/0178795 | A1 * | 8/2006 | Queveau et al. | 701/49 |

* cited by examiner

*Primary Examiner*—Daniel Wu
*Assistant Examiner*—Mark Rushing
(74) *Attorney, Agent, or Firm*—Marc E. Hankin; Kevin Schraven; Hankin Patent Law, APC (57) ABSTRACT

Various embodiments of this invention are directed towards an aftermarket automobile accessory that interfaces with vehicle Electronic Control Units (ECU's) and local networks such as Controller Area Network busses (CAN-busses) in order that a user may add performance, convenience, and safety systems to the vehicle using factory controls and displays. Various embodiments of the invention allow wireless control of cabriolet tops, automatic control of cabriolet tops, and the control of further vehicle systems.

22 Claims, 7 Drawing Sheets

MULTI-FUNCTION CONTROL AND DISPLAY APPARATUS AND DEVICE FOR AUTOMOBILES

FIELD OF INVENTION

Various embodiments of this invention relate, generally, to control devices for automobile systems; more particularly, to control devices that interface with automobile computers in order to control multiple automobile systems.

BACKGROUND

In the art of automobile engineering, an ever increasing number of luxury, convenience, safety, and performance features and options are offered for today's automobiles. With the development of automobile based computers and electronics, electronic control units (ECU's) have been developed as a common means of controlling multiple automobile systems and subsystems. Some of the ECU's featured in modern automobiles include the Engine Control Unit, the Transmission Control Unit, the Telephone Control Unit, the Man Machine Interface, the Door Control Unit, the Seat Control Unit, the Climate Control Unit, the Suspension Control Unit, and several other such control units.

In order to interface with the various ECU's, a combination of local networks such as Controller Area Networks (CAN's) or FlexRay Networks (look at: http://www.vector-informatik.com/vi_flexray_solutions_en,,223.html) have been developed as a means for connecting to and transmitting data from the ECU's. The standard CAN-bus is a broadcast differential serial bus that has been incorporated as a standard interface on numerous modern automobile systems. It's follow up standard, FlexRay, builds upon previous standards while increasing speed, fault tolerance and scalability at the same time. CAN-bus systems are commonly used by automobile manufacturers as a means for interfacing with the various ECU's, they are also used by manufacturers of aftermarket automobile accessories and systems as a means of accessing the various ECU's.

Designers of aftermarket automobile products allow automobile owners to add features and systems to their automobiles that may or may not be offered by the manufacturer of their vehicle.

One of the challenges commonly faced by developers of aftermarket automobile accessories is achieving seamless integration with existing, factory automobile systems. For example, it is undesirable for such aftermarket systems to interfere with the factory performance, appearance, or ergonomics of factory systems. Thus, aftermarket automobile improvements that integrate with factory networks, such as CAN-bus and ECU systems, such that they are not visible or intrusive, are highly desirable.

Along with the seamless integration to factory automobile systems, it is also highly desirable that aftermarket automobile improvements facilitate user-friendly controls and interfaces. Commonly, such improvements require additional displays, indicator lights, buttons or other such undesirable accessories in order to facilitate user operations. Such systems are highly undesirable for a number of reasons. First, such additional appurtenances are unsightly and interfere with factory automobile features and ergonomics. For example, some accessories are attached to the automobile by a suction cup that attaches to the vehicle's windshield. Such systems are unreliable, because the suction cup can easily become dislodged and are unattractive because they interfere with the aesthetic design of the automobile interior. Other aftermarket systems require accessories, such as keychain attached transmitters, in order to operate. These systems are likewise undesirable because of the additional parts and accessories that they require. Even when visible aftermarket accessories are not subject to these shortcomings, they are nevertheless undesirable because they may be attractive to thieves passing by the vehicle.

Another challenge to designers of aftermarket systems is integrating multiple aftermarket features into a single product. Because each of the above problems is usually compounded when multiple functions are allowed, it is especially desirable that aftermarket products performing multiple functions be concealed and seamlessly integrated into automobile systems.

Aftermarket automobile systems allow users to improve on features that are oftentimes not offered by automobile manufactures. For example, automobile manufactures often require that an automobile transmission be placed in park, an emergency brake be engaged, or the vehicle be traveling at a slow speed, prior to allowing the opening or closing of a cabriolet top. Producers of aftermarket systems, such as Wilhelmy IT, Inc., produce products that allow vehicle owners to install products that overcome these requirements. Such systems, however, commonly require additional components, such as key chain controllers. Also, these systems fail to integrate with vehicle controls, such that the user may view and control aftermarket functions from the factory vehicle controls and displays.

Other systems are known for providing vehicle features, such as those that automatically adjust rear view mirrors when turn signals are activated. U.S. Pat. No. 3,574,446 to Moore, for example, discloses such a system. Moore's device is undesirable, however, because it relies upon antiquated technologies and is not integrable with modern ECU and CAN-bus systems.

Other systems are known in the art for supplying automobile controls such as those that activate hazard lights when the automobile's reverse gear is engaged. U.S. Pat. No. 5,736,925 to Knauff et al., for example, discloses one such system. Knauff's patent, however, fails to disclose a system that is integrable as an aftermarket accessory to vehicles through the vehicle CAN-bus.

Another such system is disclosed by U.S. Pat. Nos. 6,023,221 and 5,135,119, to Michelotti and Browne, respectively, which disclose systems for activating vehicle hazard lights upon activation of the vehicle's anti-lock braking systems. These systems, similarly, fail to disclose a system that is integrable as an aftermarket accessory through vehicle CAN-busses.

While some such systems are known in the art, the existing devices often fail to offer these systems and improvements as an aftermarket accessory. What is more, when such systems are disclosed as aftermarket accessories, rarely is the system seamlessly integrable to the vehicle ECU's and its local networks, such as CAN-bus. Also, the aftermarket systems rarely allow integration such that their operations may be controlled through factory vehicle controls and displayed on factory vehicle displays.

Thus, there remains a long felt need in the art for an aftermarket automobile accessory that allows multiple performance and convenience functions to be added to a vehicle through the vehicle CAN-bus, that operates through the factory vehicle controls, and that is displayed on the existing vehicle displays.

SUMMARY OF THE INVENTION

Various embodiments of the invention disclose an aftermarket automobile device that is seamlessly integrable to factory automobile networks such as CAN-bus and it's ECU systems and allows multiple convenience and performance enhancements to be controlled through factory controls and displayed on factory displays.

In various embodiments of the invention, the device comprises an electronic apparatus that connects to automobile ECU's through the vehicle CAN-bus or any other available local networks. In this manner, the device is able to add, alter, and improve vehicle performance without the need for unsightly appurtenances and accessories. The device, for example, operates only using factory controls and displays and is able to control multiple vehicle functions from a single apparatus.

Modern automobiles often feature a plurality of buttons and switches that control vehicle functions and systems, which are provided by the factory. This device is unique and improves upon other aftermarket devices because it allows the functions to integrate while only using the existing controls. Thus, for example, in various embodiments of the invention, which feature the remote keyless opening of the cabriolet top, the device does not require an additional keychain accessory. Rather, the device operates using the wireless remote controls that are supplied on the factory keyless entry system. For complex engine management functions, modern automobiles often feature a plurality of controls, such as buttons, knobs, and switches, in order to operate one or more displays. The device further relies upon these controls, without the need for new buttons, knobs, or switches to be added to the vehicle.

Modern automobiles further commonly feature a dashboard display in order that the driver may monitor vehicle functions. Such displays are commonly used in order to display factory installed functions, such as cruise control, climate control, engine management systems, and suspension adjustment. Another improvement made by the device over related art systems is the ability to operate using only the factory display. Messages that are required in order to operate and adjust the device's features and settings are displayed on the vehicle's factory display. In this manner, the user may control multiple additional functions and operations, integrated by the device, without the need for additional displays.

Various embodiments of the invention are directed towards allowing multiple aftermarket functions and improvements to be integrated into existing factory systems. For example, the device offers numerous improvements to factory cabriolet top systems. As noted above, factory cabriolet tops often require that the vehicle's transmission be placed in park, that the emergency brake be engaged, or that the vehicle be traveling at a slow speed, in order to open or close the cabriolet top. One function, offered in various embodiments of the invention, is that the vehicle user may open or close the cabriolet top while the vehicle is in motion. For vehicles that only allow the cabriolet top to be opened or closed when the vehicle is moving slowly, the device increases the maximum speed of the vehicle at which the cabriolet top may be opened or closed.

In various embodiments of the invention, the device allows the user to open or close the cabriolet top using the factory key for the vehicle. Although not commonly offered by vehicle manufacturers, this feature is highly desirable because the user can open the cabriolet top before sitting in the car. Also, the user can close the vehicle top remotely, while walking away from the vehicle. In various embodiments of the invention, the factory keyless entry system is modified such that, by pressing the unlock button three times in rapid succession, the cabriolet top is opened or closed.

In various embodiments of the invention, the device improves upon factory cabriolet top controls by allowing one-touch operation of the cabriolet top. Factory cabriolet top controls often require that the user hold down a button as the top is opened or closed. The device improves upon conventional vehicle systems by allowing the cabriolet top to be opened or closed by pressing the control button only one time.

In various embodiments of the invention, the device improves upon factory systems by allowing users to program the cabriolet top controls such that the cabriolet top automatically opens when the vehicle doors are unlocked and automatically closes when the vehicle doors are locked. In this manner, the cabriolet top is automatically opened for the drive and automatically closed for when the vehicle is parked. Of course, the feature can be disabled using factory controls and displays during times when the feature is not desirable.

It should be noted that in allowing this additional functionality to the vehicle cabriolet top controls, the device does not rely upon new buttons, controls, or displays. Furthermore, the device integrates with the vehicle information display such that the user may monitor the device's operations. For example, the factory buttons and display are used in order to turn on and off the automatic opening and closing feature. Also, in various embodiments of the invention, the vehicle display displays information related to the status of the cabriolet top as it is opened or closed.

In various embodiments of the invention, the device integrates further improvements to vehicle systems. For example, in various embodiments of the invention, the device adds functionality to electro-mechanically controlled rear view mirrors by automatically adjusting the mirrors' angle when the vehicle turn signals are activated. In various embodiments of the invention, only the mirror on the side of the vehicle for which the indicator is activated is altered. In various embodiments of the invention, the angle of the mirror is adjusted in order to compensate for blind spots according to a pre-programmed adjustment setting. In other embodiments of the invention, the user is able to program a second mirror angle to the mirror control memory, and this feature is automatically achieved when the vehicle turn signals are activated. In this manner, the device allows the driver to adjust the rear view mirrors for changing lanes simply by activating the turn signals. It should be noted that these added functions are achieved only using the factory vehicle controls and displays.

In various embodiments of the invention, the device may be programmed to activate the beeping of the vehicle horn, blinking of the hazard lights, or both, upon selecting a reverse gear at the vehicle transmission. In this manner, the device allows additional safety features to be achieved, without the need to modify the vehicle's factory controls and displays. Once again, selection and controls are provided using the factory controls and displays.

In various embodiments of the invention, the device improves upon factory systems by allowing the user to select whether or not the vehicle horn beeps upon locking or unlocking the doors to the vehicle. Using the factory display, the user may select to turn on or off this feature.

In various embodiments of the invention, the device improves upon common factory systems by automatically activating the vehicle hazard light when the Anti-Lock Braking System (ABS), Traction Control, or Automatic Skid Control (ASC) systems are activated. In this manner, the device improves upon factory systems by automatically flashing the hazard lights when an extreme condition that would require ABS, Traction Control, or ASC, occurs.

In various embodiments of the invention, the device improves related art systems by allowing drivers to adjust pneumatic shock absorbers through vehicle controls. While some vehicles feature factory installed controls to adjust the pneumatic shocks, the factory controls are often very limited by only allowing two or three adjustment settings. Various embodiments of the invention, however, improve on these settings by allowing the user to select among a much greater plurality of shock absorber settings. The user may, for example, select the pressure in pneumatic shocks by selecting a number on the vehicle display that represents the pressure in the pneumatic shocks. Thus, the user may select shock absorber settings that lie outside of the range allowed by the factory. Further, the user may select in increments that are not allowed by the manufacturer.

The principles of the invention are particularly desirable because the device allows multiple functions to be performed without interfering with vehicle controls or requiring additional appurtenances. In this manner, a user is allowed to make a substantial upgrade to vehicle functionality without compromising existing factory features.

It should be noted that in various embodiments of the invention the above features may be used in tandem or any combination, depending on the particular desired application. Furthermore, it should be noted that the principles of the invention may be practiced with all varieties of automobiles and automobile ECU's that use a CAN-bus, FlexRay or any other local network as an interface bus with the vehicle computers.

DETAILED DESCRIPTION OF THE DRAWINGS

In the following detailed description of various embodiments of the invention, numerous specific details are set forth in order to provide a thorough understanding of various aspects of one or more embodiments of the invention. However, one or more embodiments of the invention may be practiced without these specific details. In other instances, well-known methods, procedures, and/or components have not been described in detail so as not to unnecessarily obscure aspects of embodiments of the invention.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive. Also, the reference or non-reference to a particular embodiment of the invention should not be interpreted as a limit on the scope of the invention.

In the following description, certain terminology is used to describe certain features of one or more embodiments of the invention. For instance, "automobile" or "vehicle" refers to any of the various motor and engine powered vehicles used in transportation, including but not limited to: cars, multi-person vans, sports utility vehicles, convertible cars, coupes, convertible cars featuring soft cabriolet tops, cars featuring hard cabriolet tops, leisure activity vehicles, lift-backs, mini-vans, station wagons, vans, trucks, pick-up trucks, and other such vehicles known in the art; "ECU" refers to any of the various Electronic Control Units used in modern automobiles; and "CAN-bus" refers to any of the various serial bus standards and local networks for connecting to ECU's, including but not limited to CAN-bus, LIN-bus, FlexRay, or other such automobile network systems.

Figure 1:
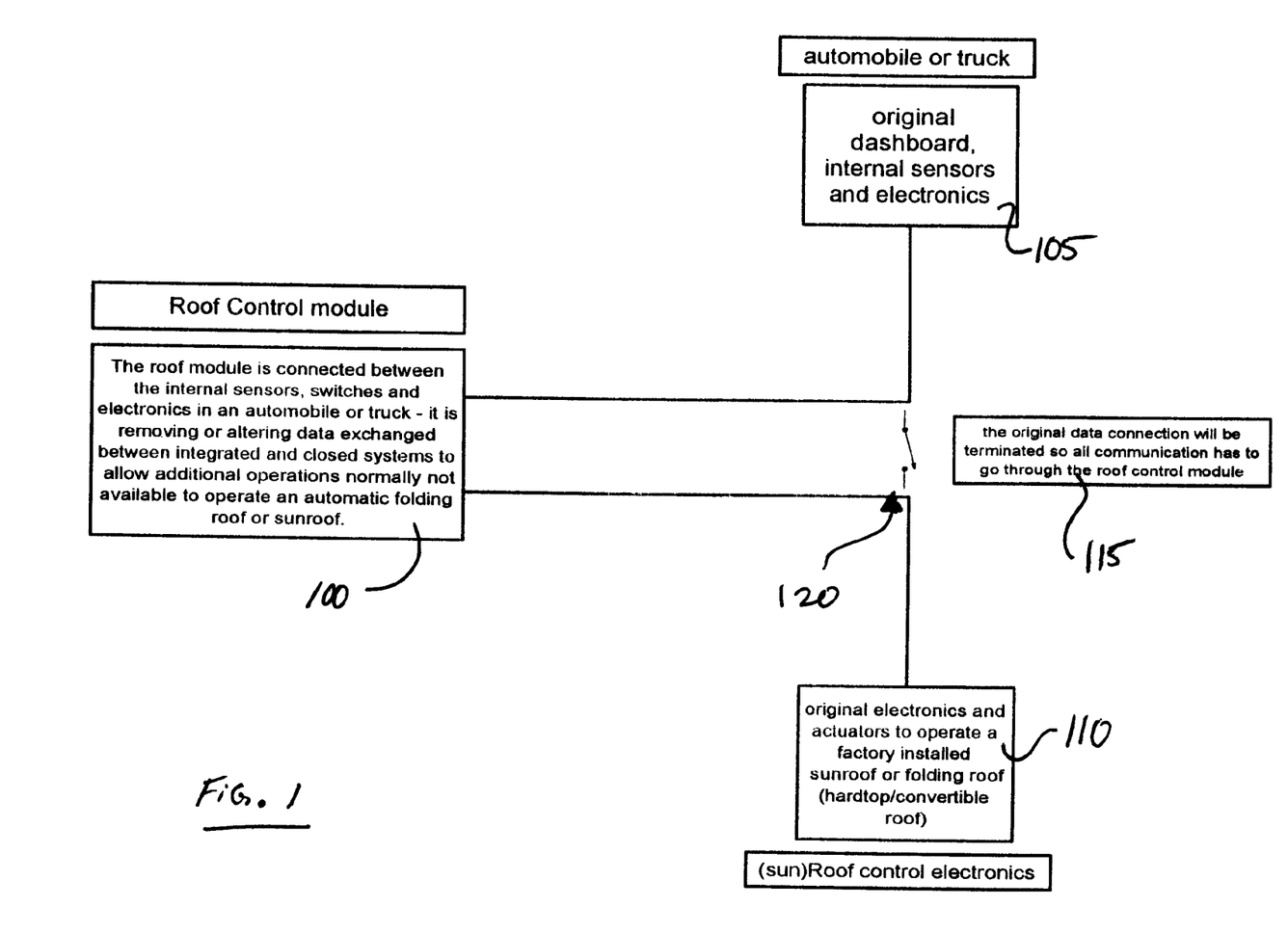
FIG. 1 is a flow chart that illustrates the operation of the roof control module in various embodiments of the invention.

FIG. 1 is a flow chart that illustrates the operation of the roof control module in various embodiments of the invention. 105 illustrates the vehicle factory dashboard electronics and controls that are used to control Roof Control Electronics 110. 100 illustrates the Roof Control Module, which is a portion of the device devoted to roof or cabriolet top controls. As diagrammed, a switch 120 connects the vehicle factory dashboard electronics and controls 105 to the Roof Control Electronics 110 via the Roof Control Module 100, such that the factory data connection is routed through the Roof Control Module 100.

Figure 2:
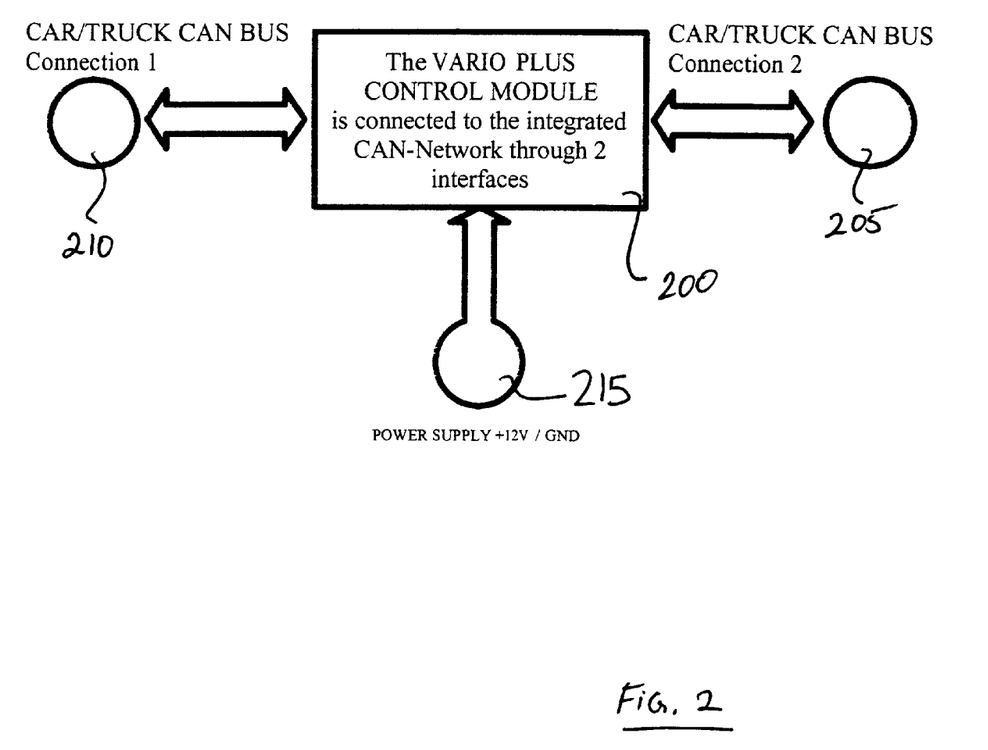
FIG. 2 is a schematic diagram that illustrates the manner in which the device is connected among a first and second vehicle CAN-bus.

FIG. 2 is a schematic diagram that illustrates the connection of the device 200 to a first CAN-bus 210 and a second CAN-bus 205. Also, as illustrated, the device 200 is connected to a power supply and ground 215.

Figure 3:
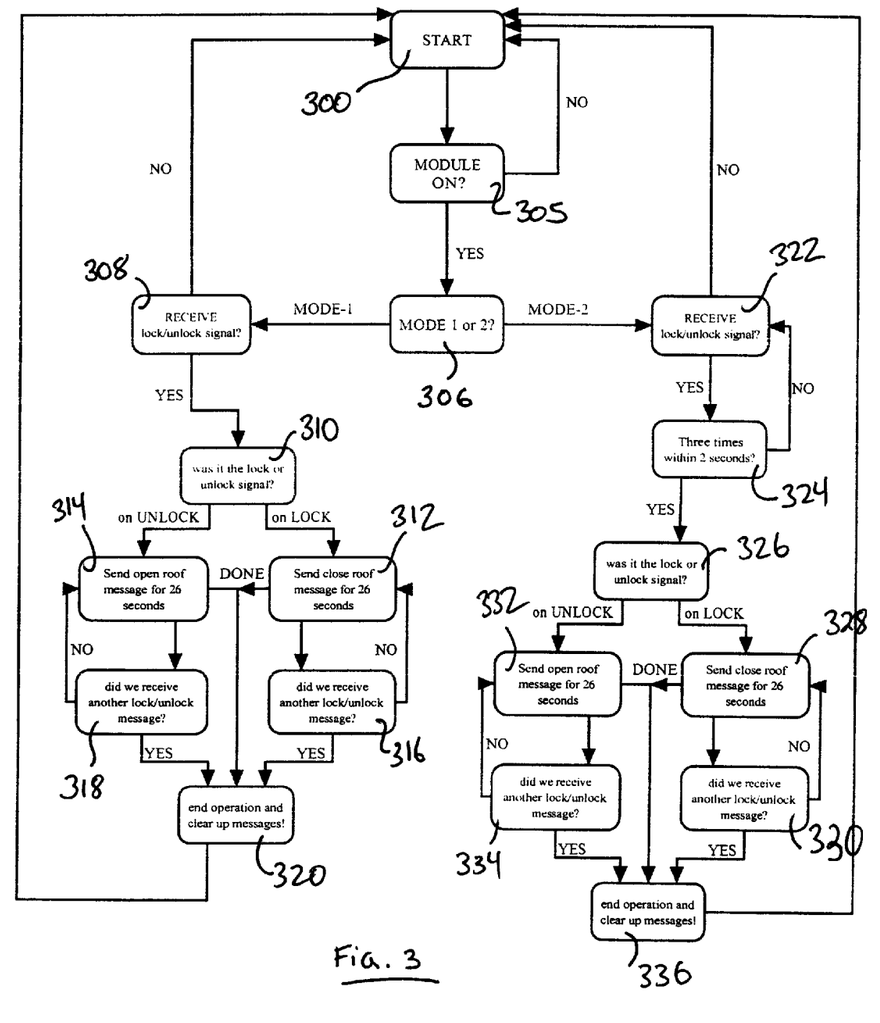
FIG. 3 is a flow chart that illustrates the operation of the convertible top control mechanism of the device in two separately selectable modes of operation.

FIG. 3 is a flow chart that illustrates the operation of the convertible top control mechanism of the device in two separately selectable modes of operation. Operation 300 illustrates the start of device operations. Operation 305 represents the on/off switch that determines whether or not the device features are activated. If the unit is turned on at operation 305, the user is allowed to select between two modes at 306: Mode 1, 308—an automatic open/close mode and Mode 2, 322 a manual open/close mode. Under the automatic open/close mode 308, when the ECU receives a door lock or unlock signal, it determines whether the signal was to lock the doors 310 and if so, sends a close roof signal to the roof control mechanism for 26-seconds 312. Then, the system determines whether or not another lock/unlock signal 316 is received. If so, the system resets 320 by ending operations and clearing prior messages. If, on the other hand, the system does not receive another door lock/unlock signal 316, the system continues the operation 312. Referring back to 310, when an unlock signal is received, the system sends an open roof message for 26-seconds 314. Then, the system determines whether or not another lock/unlock signal 318 is received. If so, the system resets 320 by ending operations and clearing prior messages. If not, the system continues the operations 314.

If Mode-2 322 is selected, the system operates only upon a command from the vehicle key. First, the system determines a lock/unlock signal 322 by whether or not the lock/unlock key is pressed three times within 2-seconds 324. Then, the system determines whether the signal was a lock signal or an unlock signal 326. If the signal received is a lock signal, the system proceeds to send a close roof signal 328 to the ECU. The system then determines whether another lock/unlock signal 330 is received and if so, ends its operations and sends resets 336. If another lock/unlock signal is not received 330, the system continues with operation 328 to close the roof. Referring back to 326, when an unlock signal is received, operation 322 sends an open roof message for 26-seconds. Operation 322 can be interrupted by operation 344 if another lock/unlock signal is received. If so, then operation 336, ending operations and resetting, is commenced. If not, operation 322 continues until completion.

Figure 4:
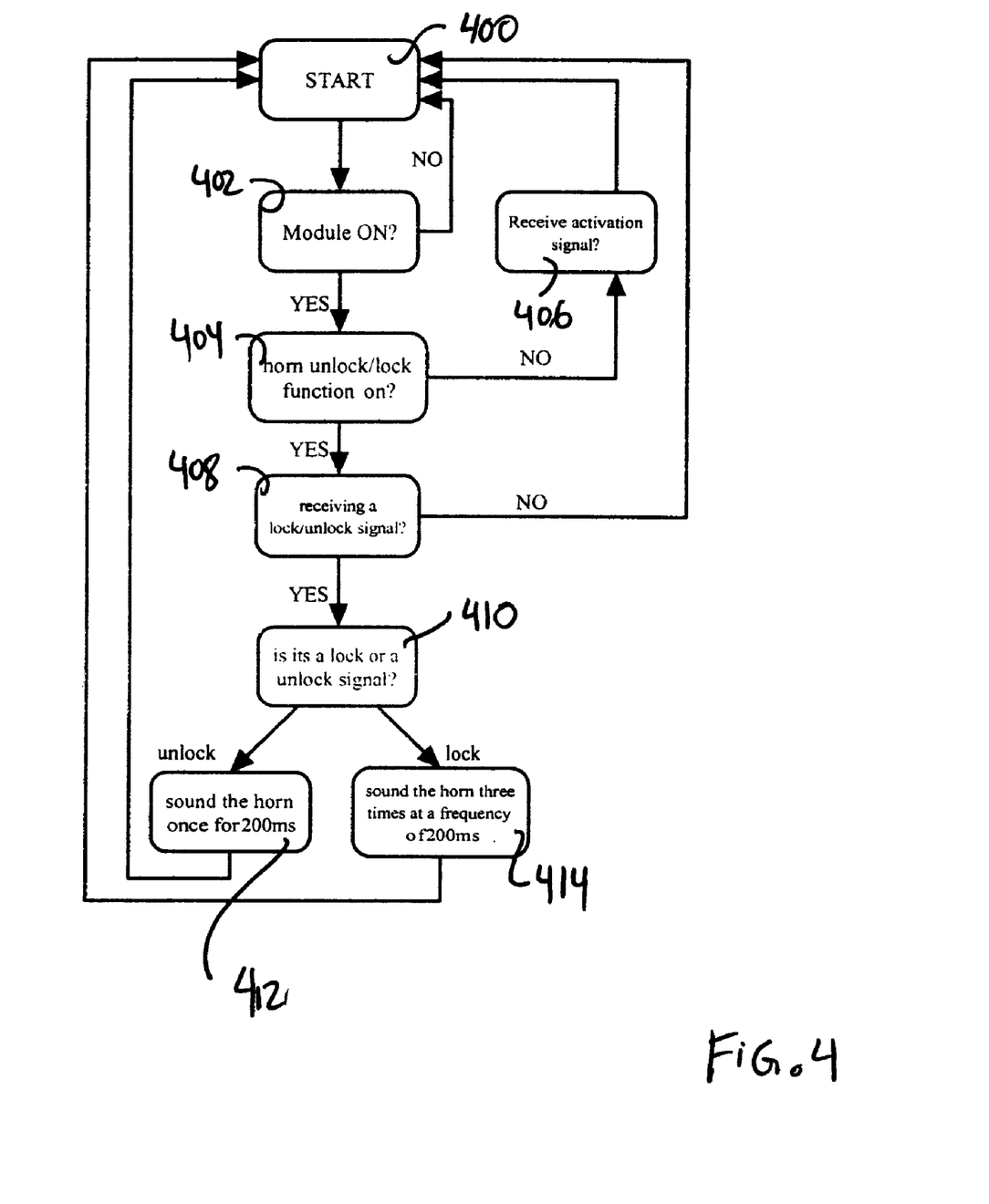
FIG. 4 is a flow chart that illustrates, diagrammatically, the operation of the horn upon lock/unlock feature.

FIG. 4 is a flow chart that illustrates, diagrammatically, the operation of the horn upon lock/unlock feature. The system start is illustrated at operation 400. If the module is turned on at operation 402 and the horn upon lock/unlock 404 feature is turned off, then the system awaits an activation signal 406. If the horn upon lock/unlock 404 feature is on, the system waits for a lock/unlock signal 408. If another signal is received 408, the system, in operation 410, determines whether it is a lock or unlock signal. If an unlock signal is received, then the system sounds the horn once for 200 ms, 412. If a lock signal is received, then the system sounds the horn three times for 200 ms each, 414. Then after 412 or 414, the system resets its start setting, 400.

Figure 5:
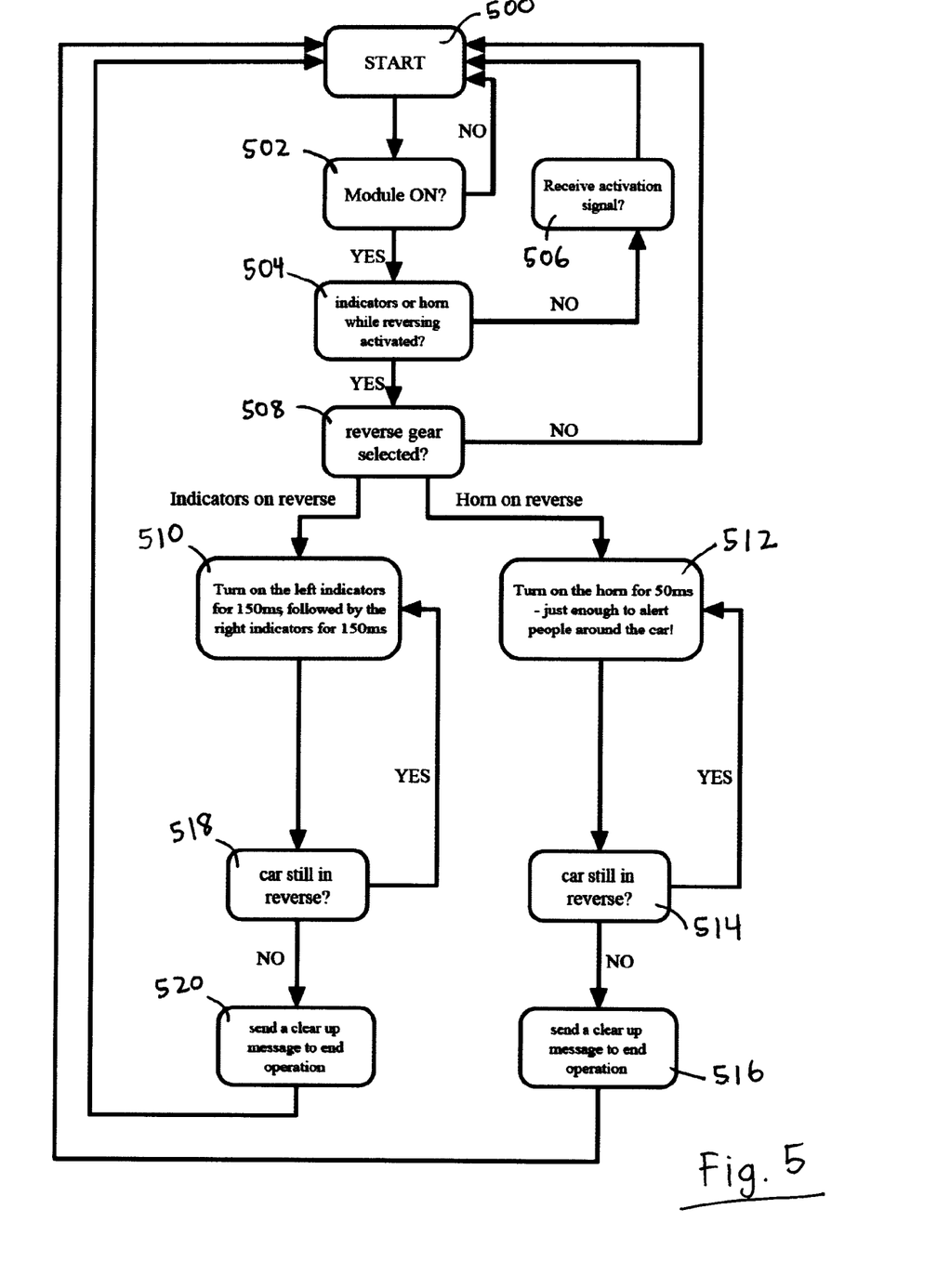
FIG. 5 is a flow chart that illustrates the operation of the vehicle's horn while reversing feature.

FIG. 5 is a flow chart that illustrates the operation of the vehicle's horn while reversing feature. The start of the flow chart is illustrated in 500. If the module is on 502, the system determines whether the horn while reversing feature is activated, in operation 504. If not, the system resets 506 to the start mode 500. If the horn while reversing feature 504 is activated, the system monitors whether the reverse gear is selected 508. If not, the system resets to the start mode 500. If the reverse gear 508 is activated and is placed in horn on reverse mode, once the transmission is placed in reverse the horn is sounded for 50 ms 512. Then, the system monitors that the car remains in reverse 514. Once the transmission is taken out of reverse, the system resets signals 516 and the system returns to start mode 500. When the system is placed in indicator on reverse mode, the car alternately flashes the left and right turn indicators for 150 ms each 510. Then the system monitors that the transmission remains in reverse 518. When the transmission is no longer in reverse, the system resets 520 and returns to the start mode 500.

Figure 6:
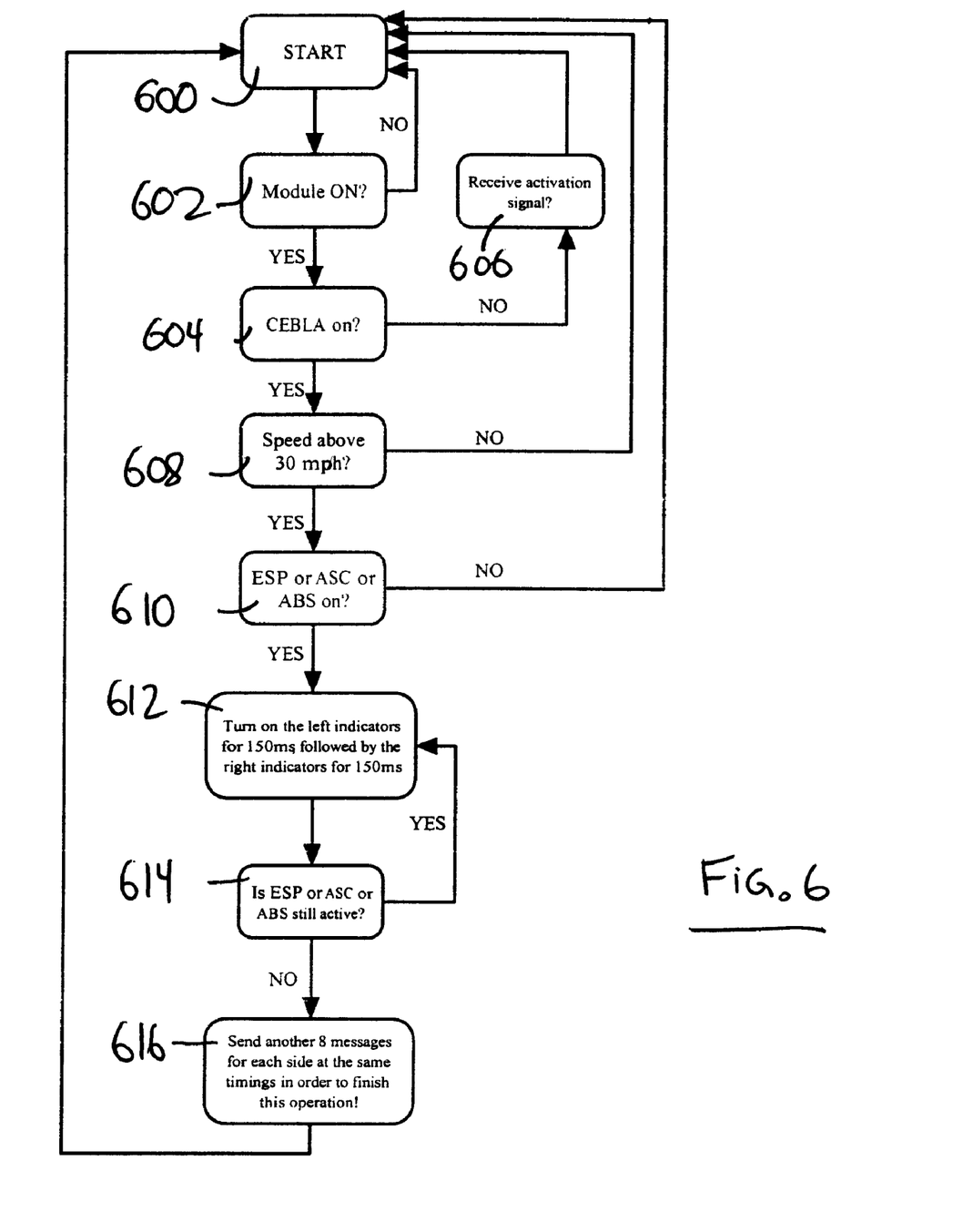
FIG. 6 is a flow chart that illustrates the operation of the module's emergency flasher mode.

FIG. 6 is a flow chart that illustrates the operation of the module's emergency flasher mode. The start of operations is diagrammed by 600. The module is turned on at 602 and the emergency flasher mode turned on at 604. If the system 604 is not on 606, the system returns to start mode 600. If the system 604 is on, the system determines whether the vehicle is traveling at over 30-miles per hour 608. If a speed of 30-miles an hour is exceeded, the system determines if the Electronic Stability Protection, Automatic Stability Control, or Anti-lock Braking System is activated 610. If so, operation 612 activates the left and right turn indicators in an alternating manner for 150 ms each. The system then determines if the systems remain activated 614. If not, the indicator lights continue for another 8-cycles 616 and, then, returns to start mode 600.

Figure 7:
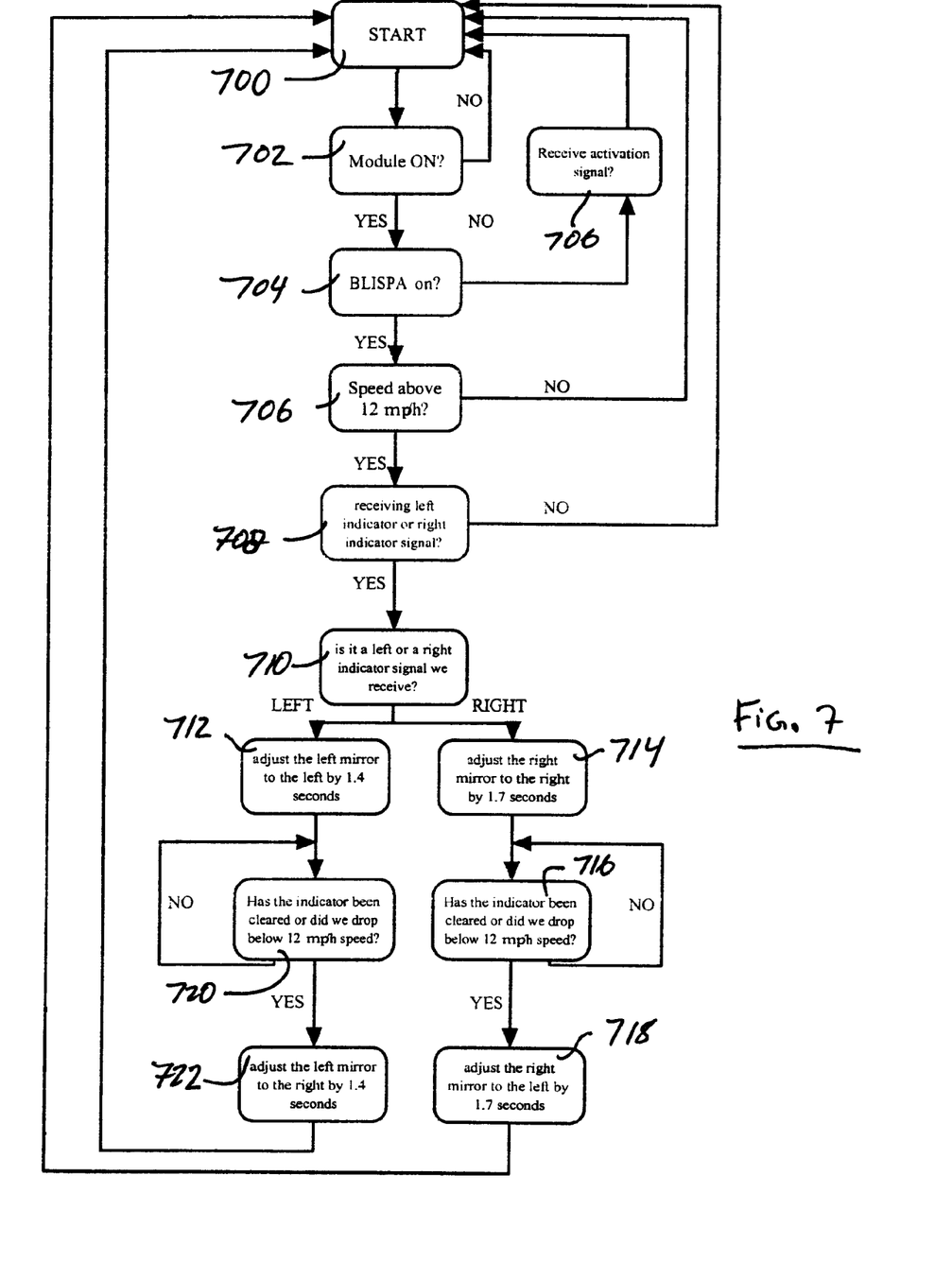
FIG. 7 is a flow chart that illustrates the operation of the blind spot assistant system.

FIG. 7 is a flow chart that illustrates the operation of the blind spot assistant module. The system starts at 700 and determines whether or not the blind spot assistant module is turned on 702. If the blind spot assistant system is on 704, the system monitors the vehicle speed for whether the speed exceeds 12-miles per hour 706. If the speed is over 12-miles per hour, the system monitors whether the left or right indicator is engaged 708. If so, then the system determines whether the signal is a left signal or a right signal 710. If the system receives a right signal, the right mirror is adjusted to the right by 1.7 seconds 714. If the indicator is cleared or the speed drops below 12-miles per hour 716, the indicator is moved to the left by 1.7 seconds 718. Referring back to 710, if, on the other hand, a left turn signal is received, the left mirror is adjusted to the left by 1.4 seconds 712. The system then monitors whether the indicator is cleared or if the speed drops below 12-miles per hour 720. If so, then the left mirror is adjusted to the right by 1.4 seconds 722.

What is claimed is:

1. An automobile control and display accessory device that is compatible with factory electronic control units (ECU's), comprising:

an ECU interface system, said ECU interface system configured to connect said device to a vehicle ECU by one or more Controller Area Network bus (CAN-bus) or any other combination of local network ports, said device configured to receive input signals only from factory buttons, switches, and knobs that are configured to transmit input signals to said ECU's and said device further configured to transmit output signals related to said device operation to one or more factory displays, said one or more factory displays configured to display settings of factory ECU components, said device being configured to override factory cabriolet top controls that require that the transmission be in park, emergency brake be engaged, or that the vehicle be traveling at a slow speed in order to open or close the cabriolet top, said device being further configured to supply open and close commands to said factory cabriolet top controls based upon signals received from factory remote keyless entry systems, said device being further configured to override factory settings related to factory cabriolet top open/close buttons which require that said buttons be depressed for the duration the said cabriolet top is opened or closed, and said device being further configured such that the device may variably be placed in an automatic mode such that said cabriolet top is automatically opened upon remote unlocking of the vehicle doors and said cabriolet top is automatically closed upon remote locking of the vehicle doors.

2. An automobile control and display accessory device that is compatible with factory electronic control units (ECU's) according to claim 1, wherein said device further allows the control of one or more further automobile functions.

3. An automobile control and display accessory device that is compatible with factory electronic control units (ECU's) according to claim 1, wherein said factory buttons include a factory vehicle wireless entry system.

4. An automobile control and display accessory device that is compatible with factory electronic control units (ECU's) according to claim 1, wherein said output signals related to device operation include output signals related to the time remaining until the cabriolet top is opened or closed.

5. An automobile control and display accessory device that is compatible with factory electronic control units (ECU's) according to claim 1, wherein additional displays to the factory displays are not required for device operations.

6. An automobile control and display accessory device that is compatible with factory electronic control units (ECU's) according to claim 1, wherein said device further includes a rear view mirror control system, said rear view mirror control system being configured to automatically adjust the angle of said rear view mirrors when the vehicle turn signals are activated and being configurable using factory controls and displays.

7. An automobile control and display accessory device that is compatible with factory electronic control units (ECU's) according to claim 6, wherein said automatically adjusted angle of said rear view mirrors is according to a pre-programmed angle of adjustment.

8. An automobile control and display accessory device that is compatible with factory electronic control units (ECU's) according to claim 6, wherein said automatically adjusted angle of said rear view mirrors is according to a user programmable angle of adjustment.

9. An automobile control and display accessory device that is compatible with factory electronic control units (ECU's) according to claim 7, wherein said automatically adjusted angle of said rear view mirrors is 1.4 seconds when the left turn signal is activated and 1.7 seconds when the right turn signal is activated.

10. An automobile control and display accessory device that is compatible with factory electronic control units (ECU's) according to claim 1, wherein said device may selectively activate the beeping of the vehicle horn, the flashing of the hazard signals, or both, upon placing the vehicle transmission in reverse and is configurable using factory controls and displays.

11. An automobile control and display accessory device that is compatible with factory electronic control units (ECU's) according to claim 1, wherein said device may selectively activate the vehicle horn upon locking or unlocking the vehicle doors using the keyless entry system and is configurable using factory buttons and controls.

12. An automobile control and display accessory device that is compatible with factory electronic control units (ECU's) according to claim 1, wherein said device may selectively activate the vehicle hazard signals when the vehicle Anti-lock Braking Systems, Traction Control, or Automatic Skid Control systems are activated and is configurable using the factory buttons and displays.

13. An automobile control and display accessory device that is compatible with factory electronic control units (ECU's) according to claim 1, wherein said device may selectively adjust the pressure in the vehicle shock absorbers according to input received through factory controls and using factory displays.

14. An automobile control and display accessory device that is compatible with factory electronic control units (ECU's) according to claim 13, wherein said display displays a number related to the pressure in said vehicle shock absorbers.

15. An automobile control and display accessory device that is compatible with factory electronic control units (ECU's), comprising:
an ECU interface system, said ECU interface system configured to connect said device to a vehicle ECU by one or more Controller Area Network bus (CAN-bus) any other combination of local network ports,
said device configured to receive input signals only from factory buttons, switches, and knobs that are configured to transmit input signals to said ECU's and said device further configured to transmit output signals related to said device operation to one or more factory displays, said one or more factory displays configured to display settings of factory ECU components,
said device being configured to override factory cabriolet top controls that require that the transmission be in park, emergency brake be engaged, or that the vehicle be traveling at a slow speed in order to open or close the cabriolet top,
said device being further configured to supply open and close commands to said factory cabriolet top controls based upon signals received from factory remote keyless entry systems,
said device being further configured to override factory settings that require factory cabriolet top open/close buttons which require that said buttons be depressed for the duration the said cabriolet top is opened or closed,
said device being further configured such that the device may variably be placed in an automatic mode such that said cabriolet top is automatically opened upon remote unlocking of the vehicle doors and said cabriolet top is automatically closed upon remote locking of the vehicle doors,
said device including a rear view mirror control system, said rear view mirror control system being configured to automatically adjust the angle of said rear view mirrors when the vehicle turn signals are activated and being configurable using factory controls and displays,
said device allowing the user to selectively activate the beeping of the vehicle horn, the flashing of the hazard signals, or both, upon placing the vehicle transmission in reverse and being configurable using factory buttons and controls,
said device allowing the user to selectively activate the vehicle horn upon locking or unlocking the vehicle doors using the keyless entry system and being configurable using factory buttons and controls,
said device allowing a user to selectively activate the vehicle hazard signals when the vehicle Anti-lock Braking Systems, Traction Control, or Automatic Skid Control systems are activated and being configurable using the factory buttons and displays, and
said device allowing a user to selectively adjust the pressure in the vehicle shock absorbers according to input received through factory controls and using factory displays.

16. An automobile control and display accessory device that is compatible with factory electronic control units (ECU's) according to claim 15, wherein said factory buttons include a factory vehicle wireless entry system.

17. An automobile control and display accessory device that is compatible with factory electronic control units (ECU's) according to claim 15, wherein said output signals related to device operation include output signals related to the time remaining until the cabriolet top is opened or closed.

18. An automobile control and display accessory device that is compatible with factory electronic control units (ECU's) according to claim 1, wherein additional displays to the factory displays are not required for device operations.

19. An automobile control and display accessory device that is compatible with factory electronic control units (ECU's) according to claim 15, wherein said automatically adjusted angle of said rear view mirrors is according to a pre-programmed angle of adjustment.

20. An automobile control and display accessory device that is compatible with factory electronic control units (ECU's) according to claim 15, wherein said automatically adjusted angle of said rear view mirrors is according to a user programmable angle of adjustment.

21. An automobile control and display accessory device that is compatible with factory electronic control units (ECU's) according to claim 19, wherein said automatically adjusted angle of said rear view mirrors is 1.4 seconds when the left turn signal is activated and 1.7 seconds when the right turn signal is activated.

22. An automobile control and display accessory device that is compatible with factory electronic control units (ECU's) according to claim 15, wherein said display displays a number related to the pressure in said vehicle shock absorbers.

* * * * *